US012413360B2

(12) United States Patent
Babaei

(10) Patent No.: US 12,413,360 B2
(45) Date of Patent: *Sep. 9, 2025

(54) SELECTIVE TRANSMISSION RECEPTION POINT (TRP)-BASED COMMUNICATIONS FOR MULTICAST AND BROADCAST SERVICES

(71) Applicant: Toyota Jidosha Kabushiki Kaisha, Toyota (JP)

(72) Inventor: Alireza Babaei, Fairfax, VA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

This patent is subject to a terminal disclaimer.

(21) Appl. No.: 18/479,382

(22) Filed: Oct. 2, 2023

(65) Prior Publication Data

US 2024/0063965 A1 Feb. 22, 2024

Related U.S. Application Data

(63) Continuation of application No. 17/454,357, filed on Nov. 10, 2021, now Pat. No. 11,811,691.

(Continued)

(51) Int. Cl.
*H04L 5/00* (2006.01)
*H04W 24/10* (2009.01)
(Continued)

(52) U.S. Cl.
CPC .......... *H04L 5/0048* (2013.01); *H04W 24/10* (2013.01); *H04W 72/23* (2023.01); *H04W 72/30* (2023.01)

(58) Field of Classification Search
CPC .... H04L 5/0048; H04W 72/30; H04W 72/23; H04W 24/10
See application file for complete search history.

(56) References Cited

U.S. PATENT DOCUMENTS 11,811,691 B1 * 11/2023 Babaei ................. H04W 72/30
2021/0378045 A1 12/2021 Zhang et al.

OTHER PUBLICATIONS

ETSI TS 138 321, "Technical Specification: Medium Access Control (MAC) protocol specification", 3GPP TS 38.321 version 16.1.0, Release 16, Jul. 2020, 153 pages.

(Continued)

*Primary Examiner* — Ronald B Abelson
(74) *Attorney, Agent, or Firm* — Finnegan, Henderson, Farabow, Garrett, and Dunner, LLP

(57) ABSTRACT

A system, method and apparatus for wireless communications is provided. A user equipment (UE) receives control information including first configuration parameters and second configuration parameters. The first configuration parameters are associated with a plurality of sets of reference signals associated with one or more transmission reception points (TRP)s and a transmission configuration indication (TCI) state. The second configuration parameters for reference signal measurements and reports for identified sets of reference signals. The UE transmits a measurement report based on the second configuration parameters and one or more identified sets of reference signals of the plurality of sets of reference signals. The UE receives scheduling information indicating a first TCI state associated with one or more identified TRPs of the plurality of TRPs of the network node. The scheduling information is based, at least in part, on a plurality of received measurement reports transmitted by a plurality of UEs.

21 Claims, 21 Drawing Sheets

Related U.S. Application Data

(60) Provisional application No. 63/112,334, filed on Nov. 11, 2020.

(51) Int. Cl.
*H04W 72/23* (2023.01)
*H04W 72/30* (2023.01)

(56) References Cited

OTHER PUBLICATIONS

ETSI TS 138 321, "5G; NR; Medium Access Control (MAC) protocol specification", 3GPP TS 38.321 version 16.1.0 Release 16, (Jul. 2020), 153 pages, (part 1, pp. 1-51).

ETSI TS 138 321, "5G; NR; Medium Access Control (MAC) protocol specification", 3GPP TS 38.321 version 16.1.0 Release 16, (Jul. 2020), 153 pages, (part 2, pp. 52-102).

ETSI TS 138 321, "5G; NR; Medium Access Control (MAC) protocol specification", 3GPP TS 38.321 version 16.1.0 Release 16, (Jul. 2020), 153 pages, (part 3, pp. 103-153).

ETSI TS 138 331, "5G: NR; Radio Resource Control (RRC); Protocol specification", 3GPP TS 38.331 version 16.1.0 Release 16, (Jul. 2020), 886 pages, (part 1, pp. 1-296).

ETSI TS 138 331, "5G: NR; Radio Resource Control (RRC); Protocol specification", 3GPP TS 38.331 version 16.1.0 Release 16, (Jul. 2020), 886 pages, (part 2, pp. 297-591).

ETSI TS 138 331, "5G: NR; Radio Resource Control (RRC); Protocol specification", 3GPP TS 38.331 version 16.1.0 Release 16, (Jul. 2020), 886 pages, (part 3, pp. 592-886).

ETSI TS 138 214, "5G; NR; Physical layer procedures for data" 3GPP TS 38.214 version 15.3.0 Release 15, (Oct. 2018), 99 pages, (part 1, pp. 1-50).

ETSI TS 138 214, "5G; NR; Physical layer procedures for data" 3GPP TS 38.214 version 15.3.0 Release 15, (Oct. 2018), 99 pages, (part 2, pp. 51-99).

\* cited by examiner

| Transport channel<br>Logical channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Transport channel<br>Logical channel | UL-SCH | RACH |
|---|---|---|
| CCCH | X | |
| DCCH | X | |
| DTCH | X | |

FIG. 3B

| Transport channel<br>Logical channel | SL-BCH | SL-SCH |
|---|---|---|
| SBCCH | X | |
| SCCH | | X |
| STCH | | X |

FIG. 3C

| Physical channel / Transport channel | PDSCH | PDCCH | PBCH |
|---|---|---|---|
| BCH | | | X |
| PCH | X | | |
| DL-SCH | X | | |

FIG. 4A

| Physical channel / Transport channel | PUSCH | PUCCH | PRACH |
|---|---|---|---|
| UL-SCH | X | | |
| RACH | | | X |

FIG. 4B

| Physical channel / Transport channel | PSSCH | PSCCH | PSFCH | PSBCH |
|---|---|---|---|---|
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6 ns according to some aspects of some of various exemplary embodiments of the present disclosure.

SELECTIVE TRANSMISSION RECEPTION POINT (TRP)-BASED COMMUNICATIONS FOR MULTICAST AND BROADCAST SERVICES

CROSS-REFERENCE TO RELATED APPLICATION

This application is a continuation of U.S. patent application Ser. No. 17/454,357, filed Nov. 10, 2021, which claims the benefit of U.S. Provisional Application No. 63/112,334, filed on Nov. 11, 2020. U.S. Provisional Application No. 63/112,334 and U.S. patent application Ser. No. 17/454,357 are incorporated by reference herein.

BACKGROUND

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION

Figure 1:
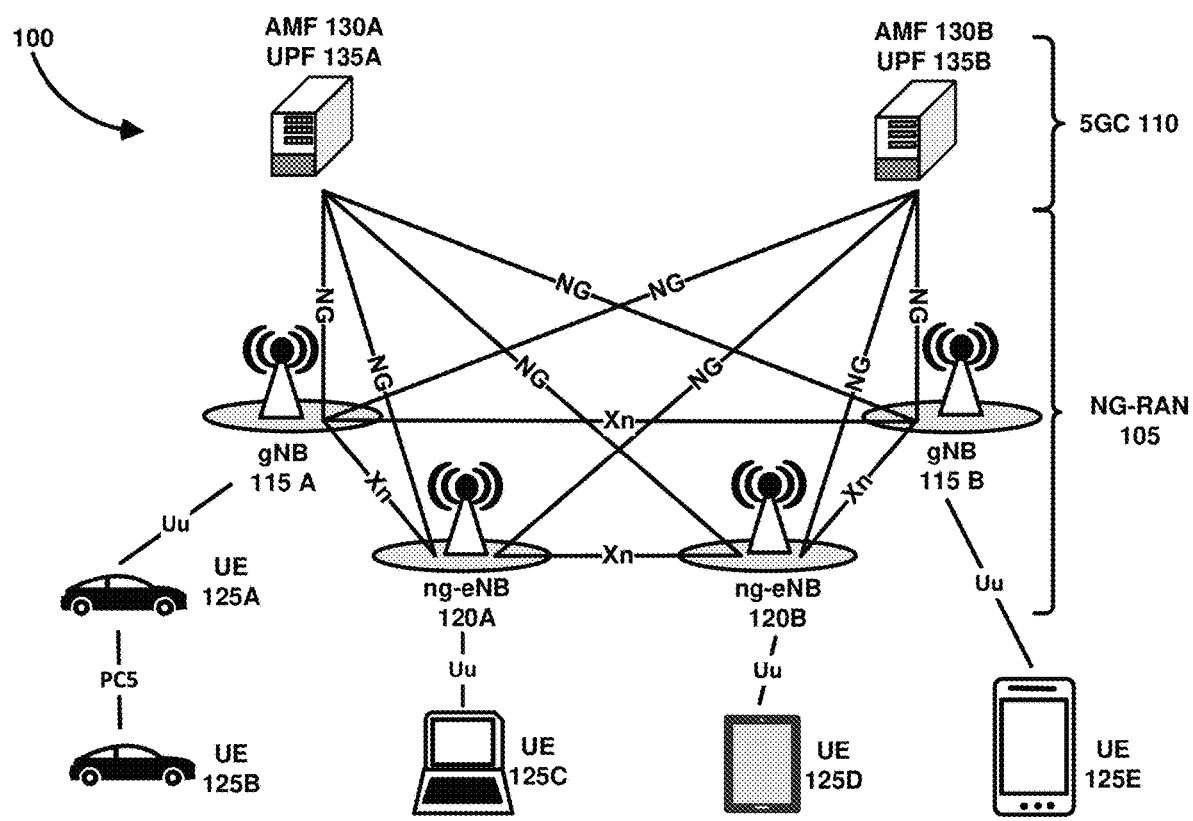
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, HOT devices, etc. Other names may be used for UEs such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5

Link Identifier may be used to indicate the PC5 unicast link whose sidelink Radio Link failure (RLF) declaration was made and PC5-RRC connection was released.

Figure 2A:
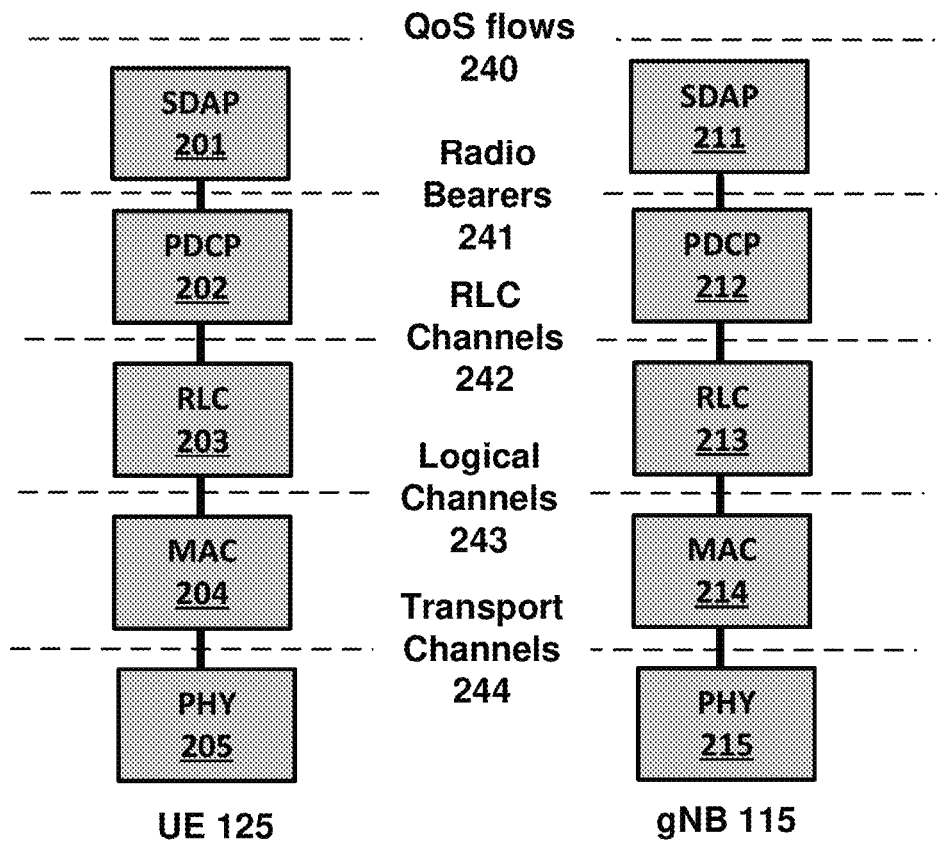
FIG. 2A and FIG. 2B show examples of radio protocol stacks for user plane and control plane, respectively, according to some aspects of some of various exemplary embodiments of the present disclosure.
Figure 2B:
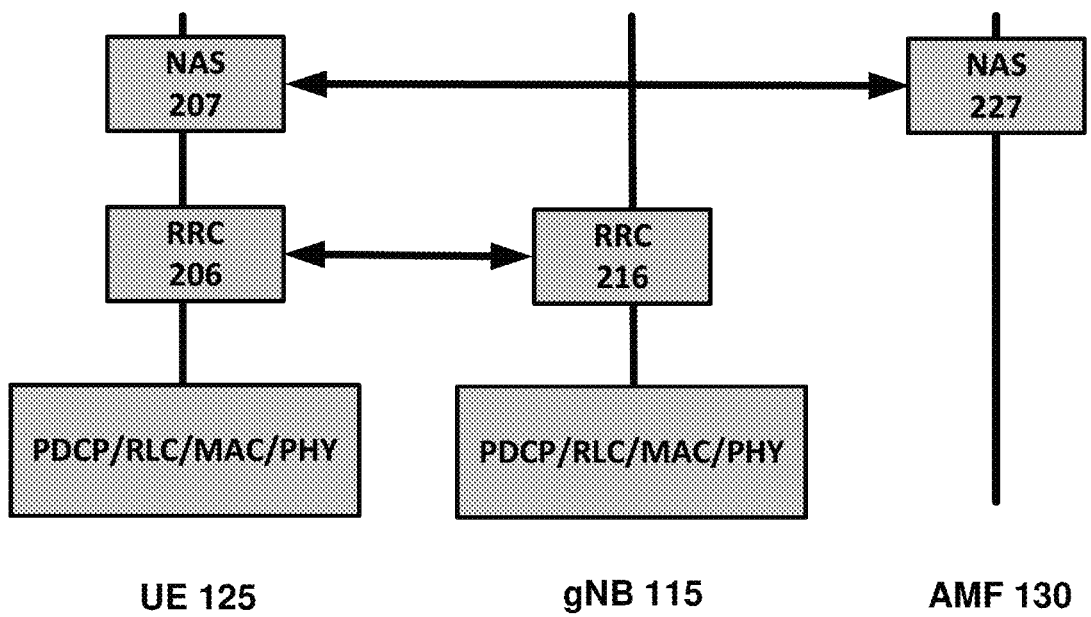

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figure 5A:
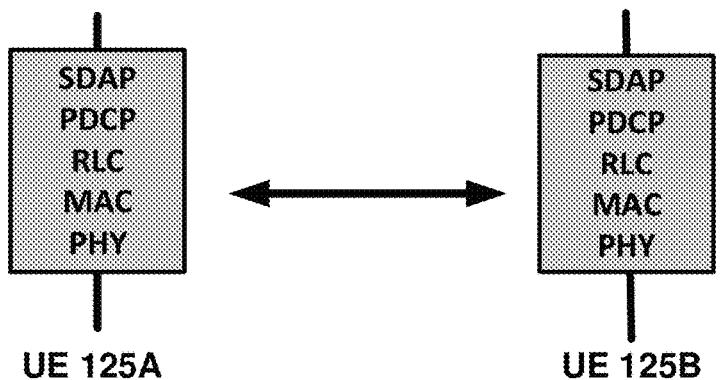
FIG. 5A, FIG. 5B, FIG. 5C and FIG. 5D show examples of radio protocol stacks for NR sidelink communication according to some aspects of some of various exemplary embodiments of the present disclosure.
Figure 5B:
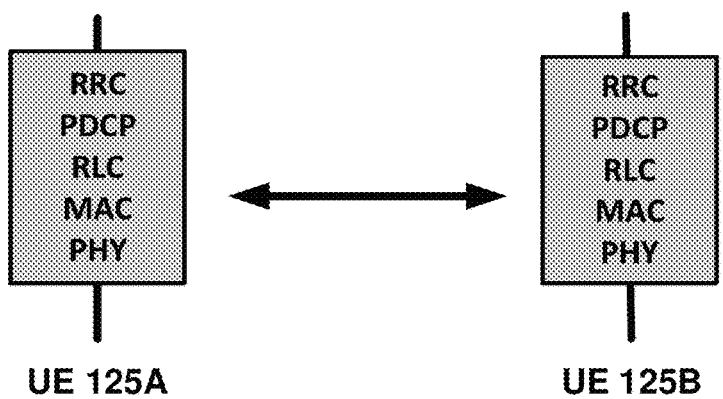
Figure 5C:
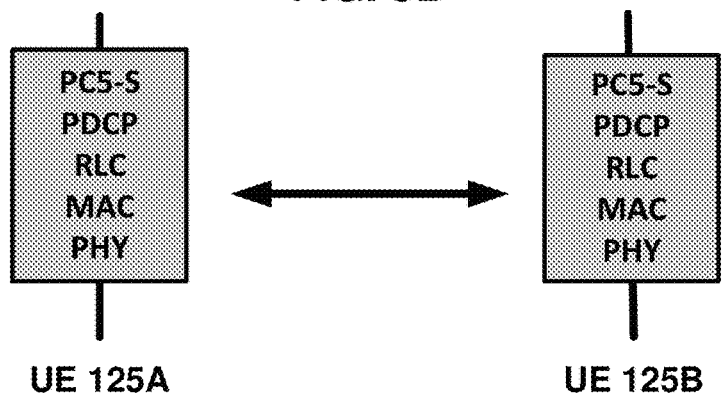
Figure 5D:
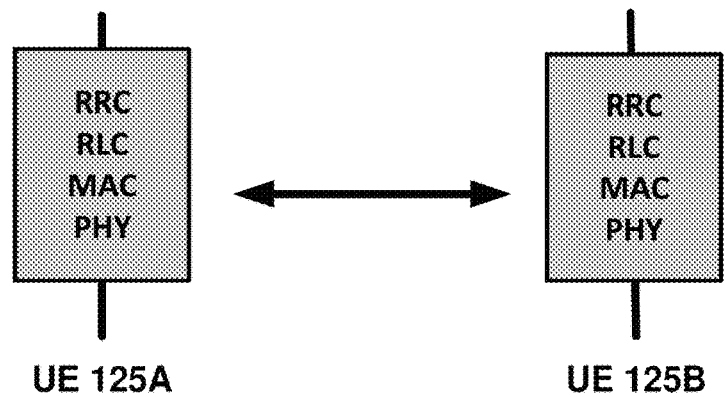

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
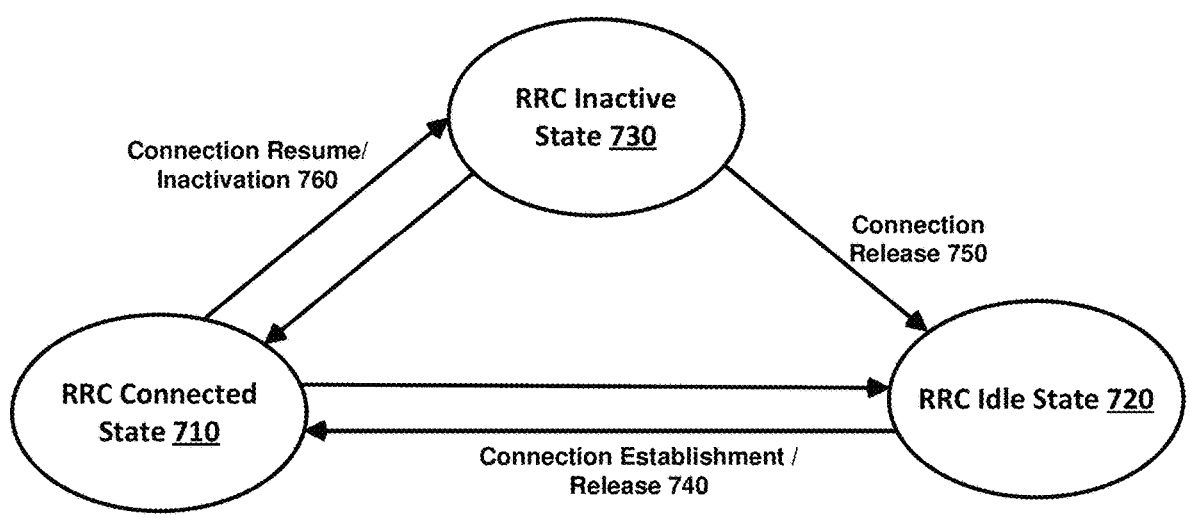
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures

760. The UE may transition from the RRC Inactive State 730 to RRC Idle State 720 using an RRC Connection Release procedure 750.

Figure 8:
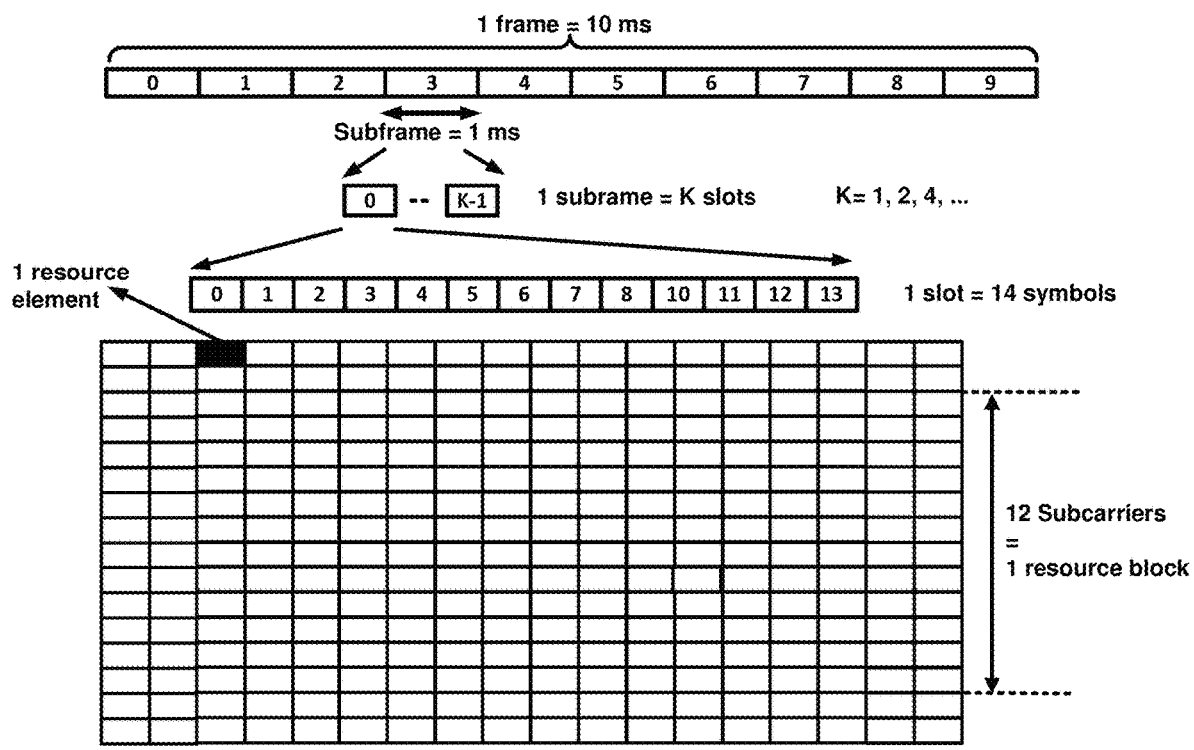
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
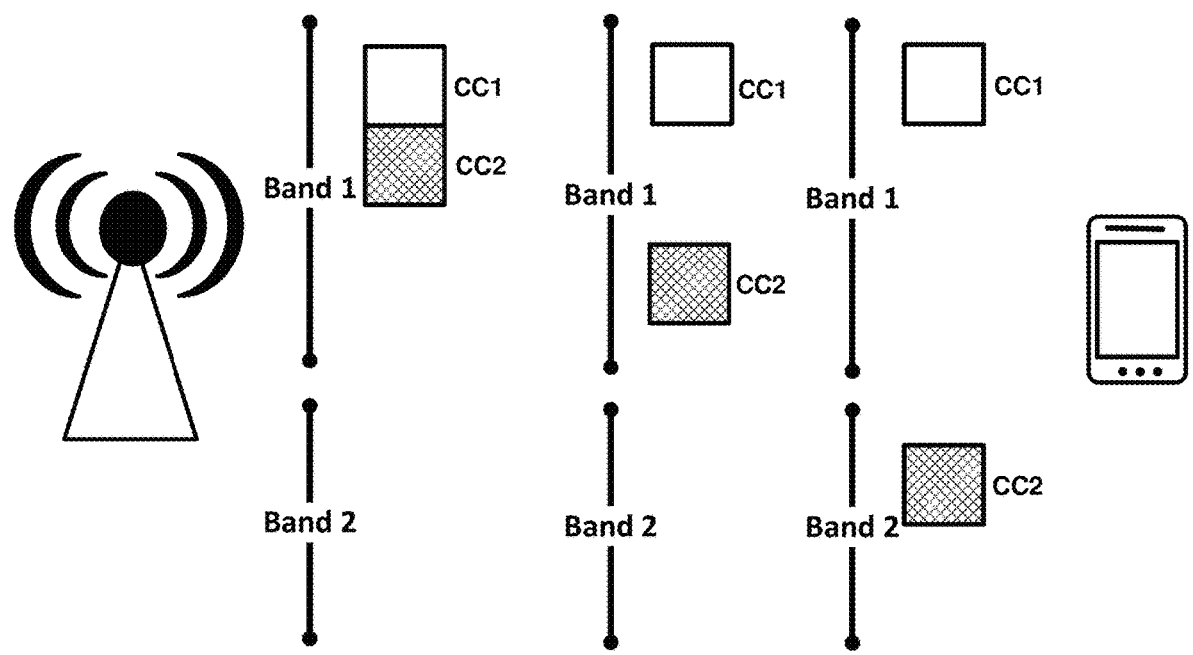
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
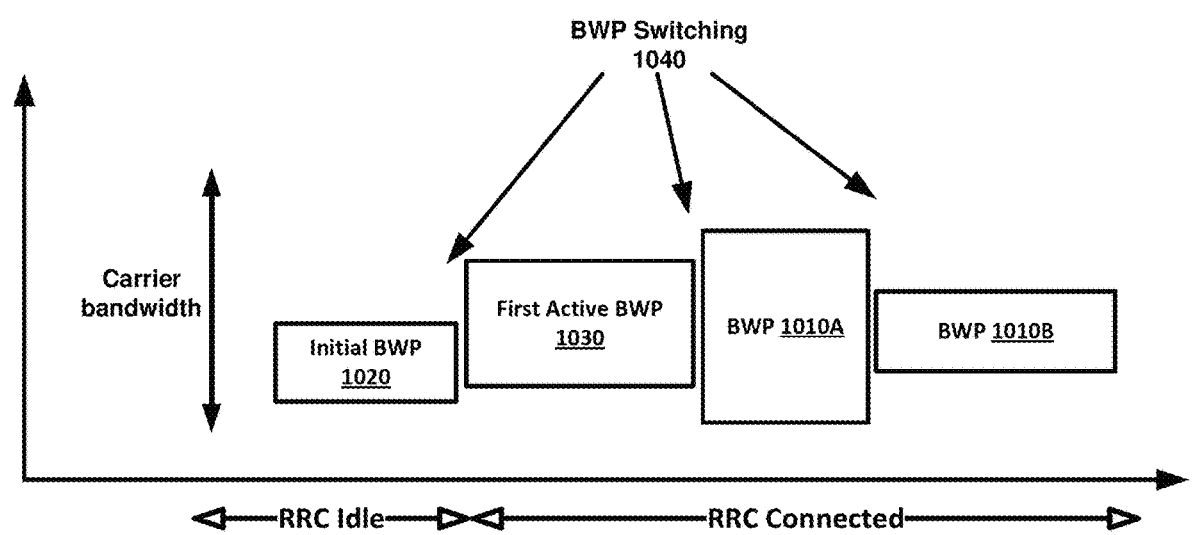
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
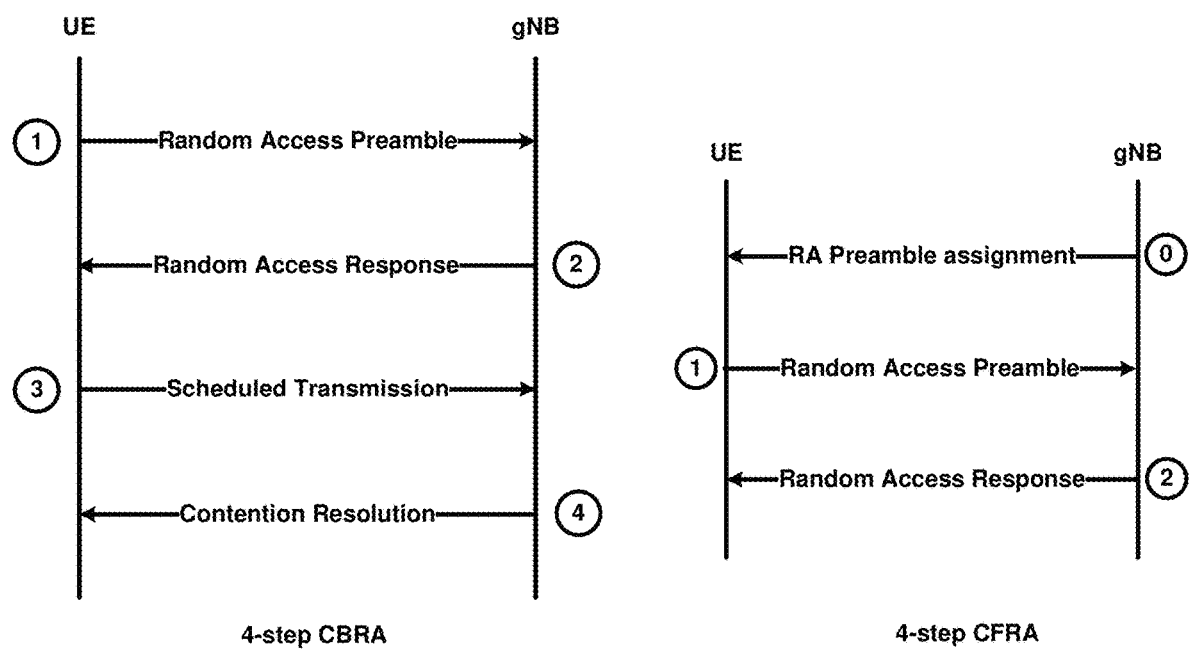
FIG. 11 shows example four-step contention-based and contention-free random access processes according to some aspects of some of various exemplary embodiments of the present disclosure.
Figure 12:
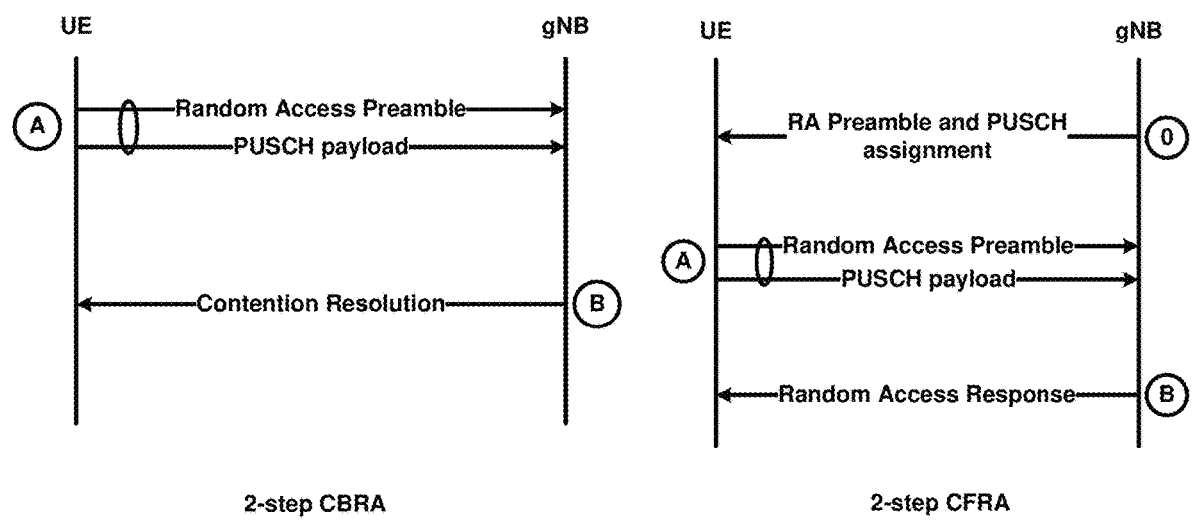
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re)transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
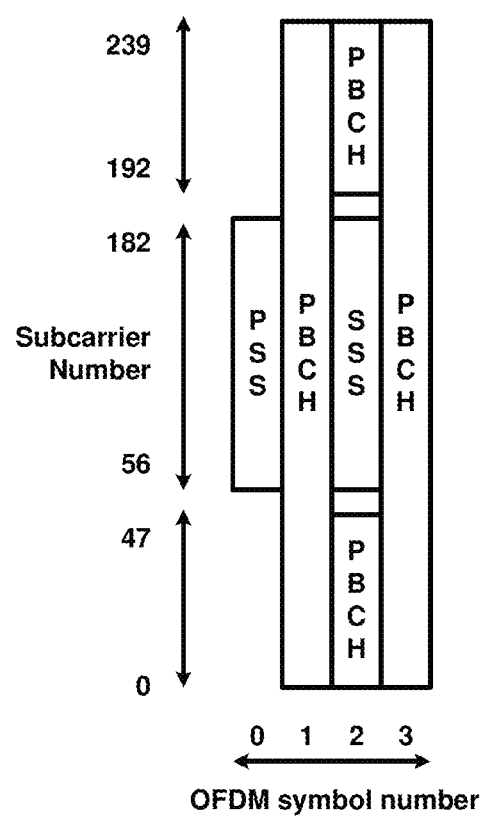
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
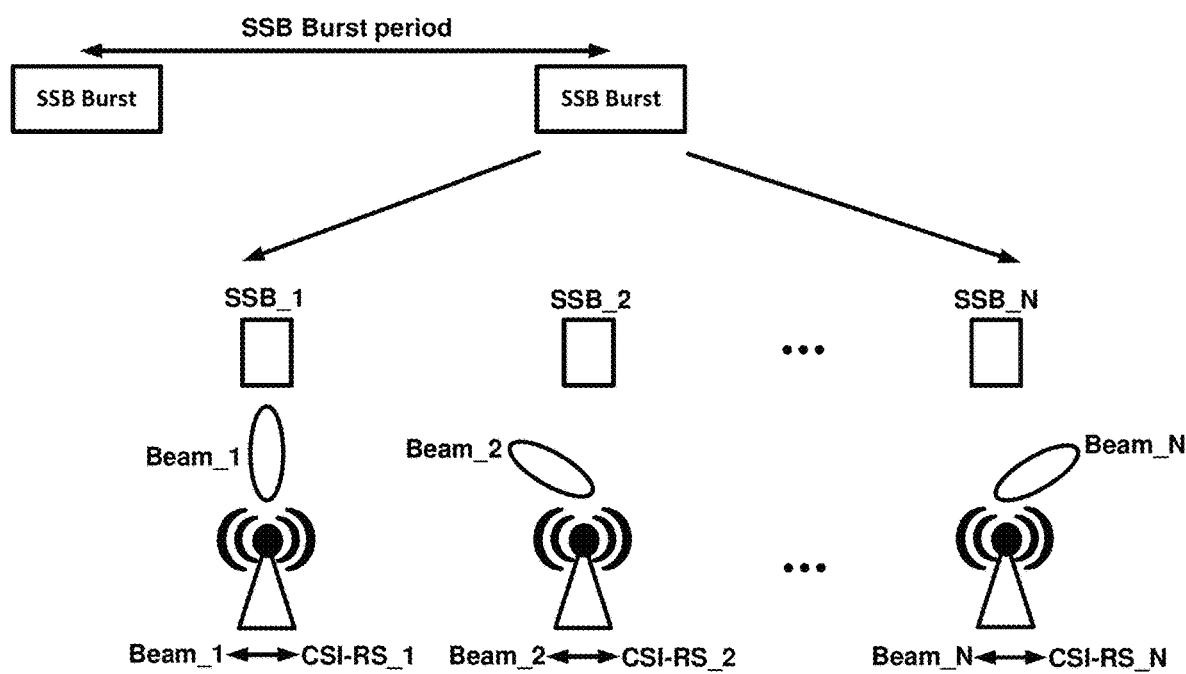
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
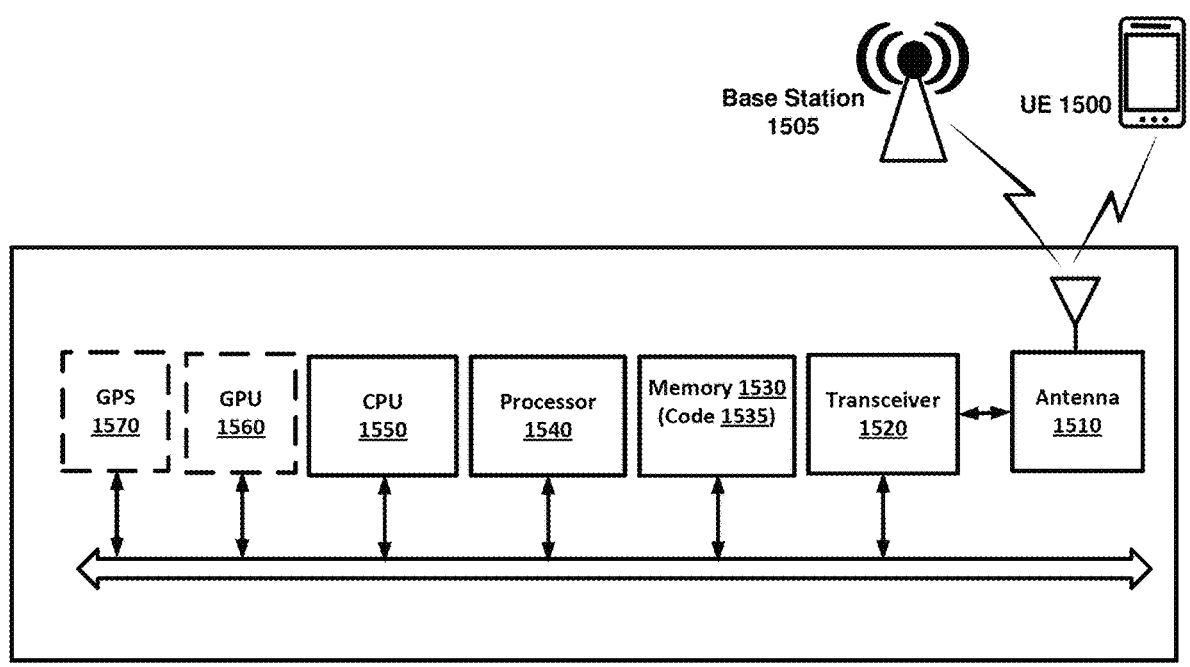
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment 1500. Accordingly, the components illustrated in FIG. 15 are not necessarily limited to either a user equipment or base station.

Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some example, MBS services may be enabled via single-cell transmission. MBS may be transmitted in the coverage of a single cell. One or more Multicast/Broadcast control channels (e.g., MCCHs) and one or more Multicast/Broadcast data channels (e.g., MTCHs) may be mapped on DL-SCH. The scheduling may be done by the gNB. The Multicast/Broadcast control channel and the Multicast/Broadcast data channel transmissions may be indicated by a logical channel specific RNTI on PDCCH. In some examples, a one-to-one mapping between a service identifier such as a temporary mobile group identifier (TMGI) and a RAN level identifier such as a group identifier (G-RNTI) may be used for the reception of the DL-SCH to which a Multicast/Broadcast data channel may be mapped. In some examples, a single transmission may be used for DL-SCH associated with the Multicast/Broadcast control channel and/or the Multicast/Broadcast data channel transmissions and HARQ or RLC retransmissions may not be used and/or an RLC Unacknowledged Mode (RLC UM) may be used. In other examples some feedback (e.g., HARQ feedback or RLC feedback) may be used for transmissions via Multicast/Broadcast control channel and/or Multicast/Broadcast data channels.

In some example, for Multicast/Broadcast data channel, the following scheduling information may be provided on Multicast/Broadcast control channel: a Multicast/Broadcast data channel scheduling cycle, a Multicast/Broadcast data channel on-duration (e.g., duration that the UE waits for, after waking up from DRX, to receive PDCCHs), a Multicast/Broadcast data channel inactivity timer (e.g., duration that the UE waits to successfully decode a PDCCH, from the last successful decoding of a PDCCH indicating the DL-SCH to which this Multicast/Broadcast data channel is mapped, failing which it re-enters DRX).

In some examples, one or more UE identities may be related to MBS transmissions. The one or more identities may comprise at least one of: one or more first RNTIs that identify transmissions of the Multicast/Broadcast control channel; one or more second RNTIs that identify transmissions of a Multicast/Broadcast data channels. The one or more first RNTIs that identify transmissions of the Multicast/Broadcast control channel may comprise a single cell RNTI (SC-RNTI, other names may be used). The one or more second RNTIs that identify transmissions of a Multicast/Broadcast data channels may comprise a G-RNTI (nG-RNTI or other names may be used).

In some examples, one or more logical channels may be related to MBS transmissions. The one or more logical channels may comprise a Multicast/Broadcast control channel. The Multicast/Broadcast control channel may be a point-to-multipoint downlink channel used for transmitting MBS control information from the network to the UE, for one or several Multicast/Broadcast data channel. This channel may be used by UEs that receive or are interested to receive MBS. The one or more logical channels may comprise a Multicast/Broadcast data channel. This channel may be a point-to-multipoint downlink channel for transmitting MBS traffic data from the network.

Figure 16:
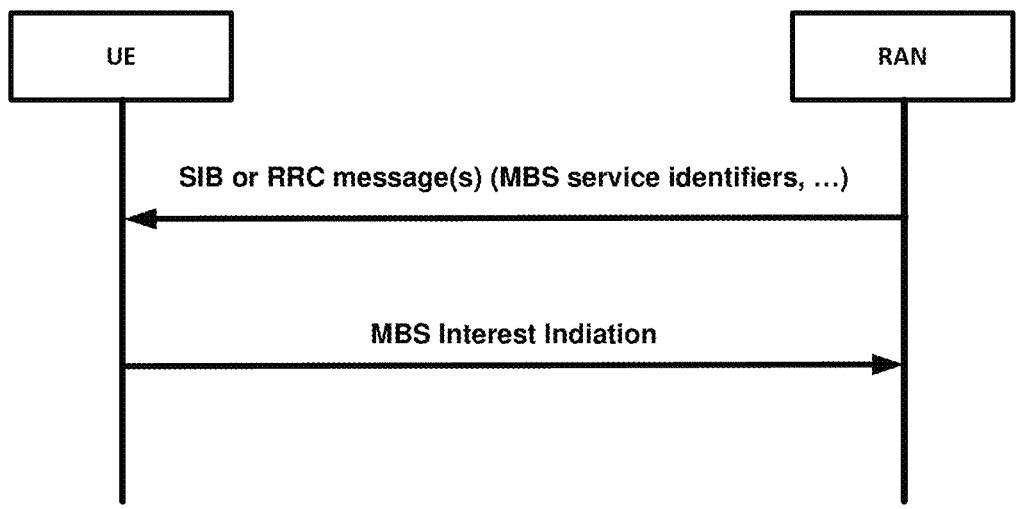
FIG. 16 shows an example multicast broadcast service (MBS) interest indication according to some aspects of some of various exemplary embodiments of the present disclosure.

In some examples, a procedure may be used by the UE to inform RAN that the UE is receiving or is interested to receive MBS service(s) via an MBS radio bearer, and if so, to inform the 5G RAN about the priority of MBS versus unicast reception or MBS service(s) reception in receive only mode. An example is shown in FIG. 16. The UE may transmit a message (e.g., an MBS interest indication message) message to inform RAN that the UE is receiving/interested to receive or no longer receiving/interested to receive MBS service(s). The UE may transmit the message based on receiving one or more messages (e.g., a SIB message or a unicast RRC message) from the network for example indicating one or more MBS Service Area Identifiers of the current and/or neighboring carrier frequencies.

In some examples, the UE may consider an MBS service to be part of the MBS services of interest if the UE is capable of receiving MBS services (e.g., via a single cell point to multipoint mechanism); and/or the UE is receiving or interested to receive this service via a bearer associated with MBS services; and/or one session of this service is ongoing or about to start; and/or at least one of the one or more MBS service identifiers indicated by network is of interest to the UE.

In some examples, control information for reception of MBS services may be provided on a specific logical channel: (e.g., a MCCH). The MCCH may carry one or more configuration messages which indicate the MBS sessions that are ongoing as well as the (corresponding) information on when each session may be scheduled, e.g., scheduling period, scheduling window and start offset. The one or more configuration messages may provide information about the neighbor cells transmitting the MBS sessions which may be ongoing on the current cell. In some examples, the UE may receive a single MBS service at a time, or more than one MBS services in parallel.

In some example, the MCCH information (e.g., the information transmitted in messages sent over the MCCH) may be transmitted periodically, using a configurable repetition period. The MCCH transmissions (and the associated radio resources and MCS) may be indicated on PDCCH.

In some examples, change of MCCH information may occur at specific radio frames/subframes/slots and/or a modification period may be used. For example, within a modification period, the same MCCH information may be transmitted a number of times, as defined by its scheduling (which is based on a repetition period). The modification period boundaries may be defined by SFN values for which SFN mod m=0, where m is the number of radio frames comprising the modification period. The modification period may be configured by a SIB or by RRC signaling.

In some examples, when the network changes (some of) the MCCH information, it may notify the UEs about the change in the first subframe/slot which may be used for MCCH transmission in a repetition period. Upon receiving a change notification, a UE interested to receive MBS services may acquire the new MCCH information starting from the same subframe/slot. The UE may apply the previously acquired MCCH information until the UE acquires the new MCCH information.

In an example, a system information block (SIB) may contain the information required to acquire the control information associated transmission of MBS. The information may comprise at least one of: one or more discontinuous reception (DRX) parameters for monitoring for scheduling information of the control information associated transmission of MBS, scheduling periodicity and offset for scheduling information of the control information associated transmission of MBS, modification period for modification of content of the control information associated transmission of MBS, repetition information for repetition of the control information associated transmission of MBS, etc.

In an example, an information element (IE) may provide configuration parameters indicating, for example, the list of ongoing MBS sessions transmitted via one or more bearers for each MBS session, one or more associated RNTIs (e.g., G-RNTI, other names may be used) and scheduling information. The configuration parameters may comprise at least one of: one or more timer values for discontinuous reception (DRX) (e.g., an inactivity timer or an On Duration timer), an RNTI for scrambling the scheduling and transmission of a Multicast/Broadcast traffic channel (e.g., MTCH, other names may be used), ongoing MBS session, one or more power control parameters, one or more scheduling periodicity and/or offset values for one or more MBS traffic channels, information about list of neighbor cells, etc.

In some examples a gNB or ng-eNB may comprise logical nodes that host some, all or parts of the user plane and/or control plane functionalities. For example, a gNB Central Unit (gNB-CU) may be a logical node hosting RRC, SDAP and PDCP protocols of the gNB or RRC and PDCP protocols of the en-gNB that controls the operation of one or more gNB-DUs. The gNB-CU may terminate the F1 interface connected with the gNB-DU. A gNB Distributed Unit (gNB-DU) may be a logical node hosting RLC, MAC and PHY layers of the gNB or en-gNB, and its operation may be partly controlled by gNB-CU. One gNB-DU may support one or multiple cells. One cell may be supported by only one gNB-DU. The gNB-DU may terminate the F1 interface connected with the gNB-CU. A gNB-CU-Control Plane (gNB-CU-CP) may be a logical node hosting the RRC and the control plane part of the PDCP protocol of the gNB-CU for an en-gNB or a gNB. The gNB-CU-CP may terminate the E1 interface connected with the gNB-CU-UP and the F1-C interface connected with the gNB-DU. A gNB-CU-User Plane (gNB-CU-UP) may be a logical node hosting the user plane part of the PDCP protocol of the gNB-CU for an en-gNB, and the user plane part of the PDCP protocol and the SDAP protocol of the gNB-CU for a gNB. The gNB-CU-UP may terminate the E1 interface connected with the gNB-CU-CP and the F1-U interface connected with the gNB-DU.

In some examples, in RRC_CONNECTED state, a UE may measure multiple beams (e.g., at least one) of a cell and the measurements results (e.g., power values) may be averaged to derive the cell quality. In doing so, the UE may be configured to consider a subset of the detected beams. Filtering may take place at two different levels: at the physical layer to derive beam quality and then at RRC level to derive cell quality from multiple beams. Cell quality from beam measurements may be derived in the same way for the serving cell(s) and for the non-serving cell(s). Measurement reports may contain the measurement results of the X best beams if the UE is configured to do so by the gNB.

Figure 17:
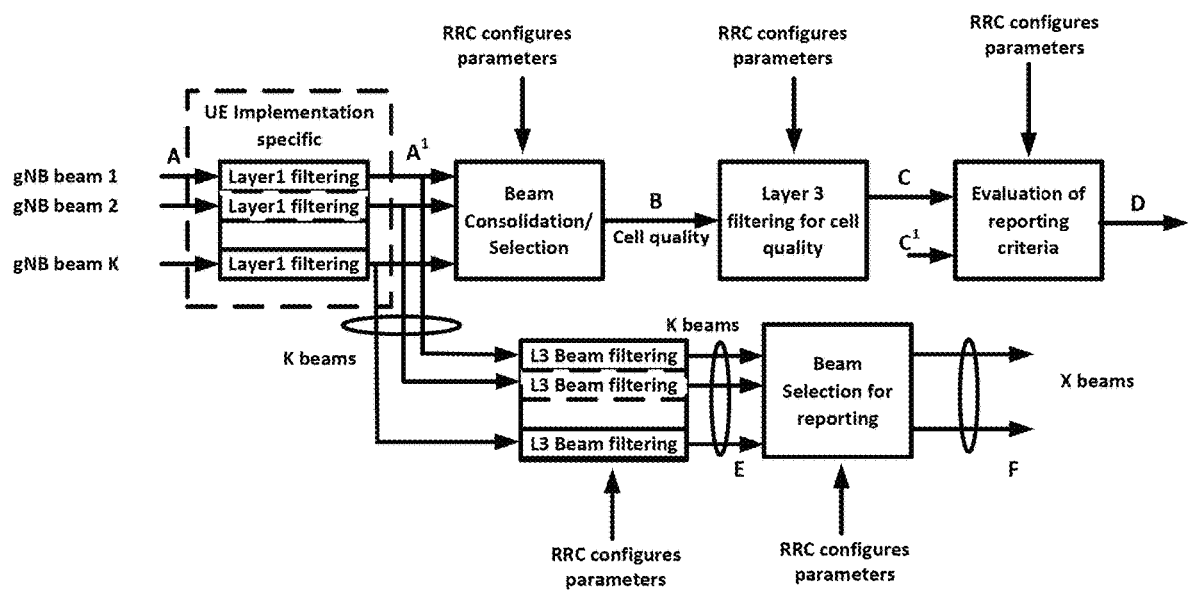
FIG. 17 shows an example measurement model according to some aspects of some of various exemplary embodiments of the present disclosure.

An example high-level measurement model is shown in FIG. 17 and described below. In some examples, K beams may correspond to the measurements on SSB or CSI-RS resources configured for L3 mobility by gNB and detected by UE at L1. In FIG. 17, A may indicate measurements (beam specific samples) internal to the physical layer. Layer 1 filtering may indicate internal layer 1 filtering of the inputs measured at point A. Exact filtering may be implementation dependent. A1 may indicate measurements (e.g., beam specific measurements) reported by layer 1 to layer 3 after layer 1 filtering. Beam Consolidation/Selection may refer to beam specific measurements being consolidated to derive cell quality. The behaviour of the Beam consolidation/selection and its configuration may be provided by RRC signalling. Reporting period at B may equal one measurement period at A1. B may indicate a measurement (e.g., cell quality) derived from beam-specific measurements reported to layer 3 after beam consolidation/selection. Layer 3 filtering for cell quality may indicate filtering performed on the measurements provided at point B. The configuration of the layer 3 filters may be provided by RRC signalling. Filtering reporting period at C may equal one measurement period at B. The point C may indicate a measurement after processing in the layer 3 filter. The reporting rate may be identical to the reporting rate at point B. This measurement may be used as input for one or more evaluation of reporting criteria. Evaluation of reporting criteria may check whether actual measurement reporting is necessary at point D. The evaluation may be based on more than one flow of measurements at reference point C e.g. to compare between different measurements. This is illustrated by input C and C1. The UE may evaluate the reporting criteria at least every time a new measurement result is reported at point C, C1. The point D may refer to measurement report information (message) sent on the radio interface. The L3 Beam filtering may refer to filtering performed on the measurements (e.g., beam specific measurements) provided at point A1. The point E may refer to a measurement (e.g., beam-specific measurement) after processing in the beam filter. The beam Selection for beam reporting may refer to selecting the X measurements from the measurements provided at point E. The configuration of this module may br provided by RRC signalling. The point F may refer to beam measurement information included in measurement report (sent) on the radio interface.

In some examples, layer 1 filtering may introduce a certain level of measurement averaging. Layer 3 filtering may be used for cell quality and related parameters. Measurement reports may be characterized by the following: Measurement reports may include the measurement identity of the associated measurement configuration that triggered the reporting; Cell and beam measurement quantities to be included in measurement reports may be configured by the network; The number of non-serving cells to be reported may be limited through configuration by the network; Cells belonging to a blacklist configured by the network may not be used in event evaluation and reporting, and conversely when a whitelist is configured by the network, only the cells belonging to the whitelist may be used in event evaluation and reporting; Beam measurements to be included in measurement reports may be configured by the network (beam identifier only, measurement result and beam identifier, or no beam reporting).

In some examples, DCI format 1_1 may be used for the scheduling of PDSCH in one cell. A DCI format 1_1 with CRC scrambled by C-RNTI or CS-RNTI or MCS-C-RNTI may comprise a Transmission configuration indication field which may have a bitwidth of 0 bit if higher layer parameter tci-PresentInDCI is not enabled; otherwise the bitwidth of this field may be 3 bits. If the Bandwidth part indicator field indicates a bandwidth part other than the active bandwidth part, if the higher layer parameter tci-PresentInDCI is not enabled for the CORESET used for the PDCCH carrying the DCI format 1_1, the UE may assume tci-PresentInDCI is not enabled for all CORESETs in the indicated bandwidth part; otherwise, the UE may assume tci-PresentInDCI is enabled for all CORESETs in the indicated bandwidth part.

In some examples, DCI format 1_2 may be used for the scheduling of PDSCH in one cell. A DCI format 1_2 with CRC scrambled by C-RNTI or CS-RNTI or MCS-C-RNTI may comprise a Transmission configuration indication field which may have a bitwidth of 0 bit if higher layer parameter tci-PresentForDCI-Format1-2 is not enabled; otherwise the bitwidth may be 1 or 2 or 3 bits determined by higher layer parameter tci-PresentForDCI-Format1-2. If a Bandwidth part indicator field indicates a bandwidth part other than the active bandwidth part, if the higher layer parameter tci-PresentForDCI-Format1-2 is not enabled for the CORESET used for the PDCCH carrying the DCI format 1_2, the UE may assume tci-PresentForDCI-Format1-2 is not enabled for all CORESETs in the indicated bandwidth part; otherwise, the UE may assume tci-PresentForDCI-Format1-2 is enabled for all CORESETs in the indicated bandwidth part.

In some examples, the multicast and broadcast services (MBS) design may allow spectrum and power efficient delivery of data for a variety of use cases, including multimedia broadcasting and multicasting of contents such as videos, public safely group communications, V2X and some Internet of Tings (IoT) applications.

In some examples, the MBS design may be based on a single cell point-to-multipoint (PTM) architecture without use of single frequency network (SFN) framework. The reliable and efficient delivery MBS data to users in a multicast group, especially at frequency range 2 (FR2) may require transmissions across multiple nodes, TRPs and/or beams. In some examples, reliable delivery of MBS data with service continuity and mobility may require transmission of data from multiple transmission reception points (TRPs) and/or beams.

Figure 18:
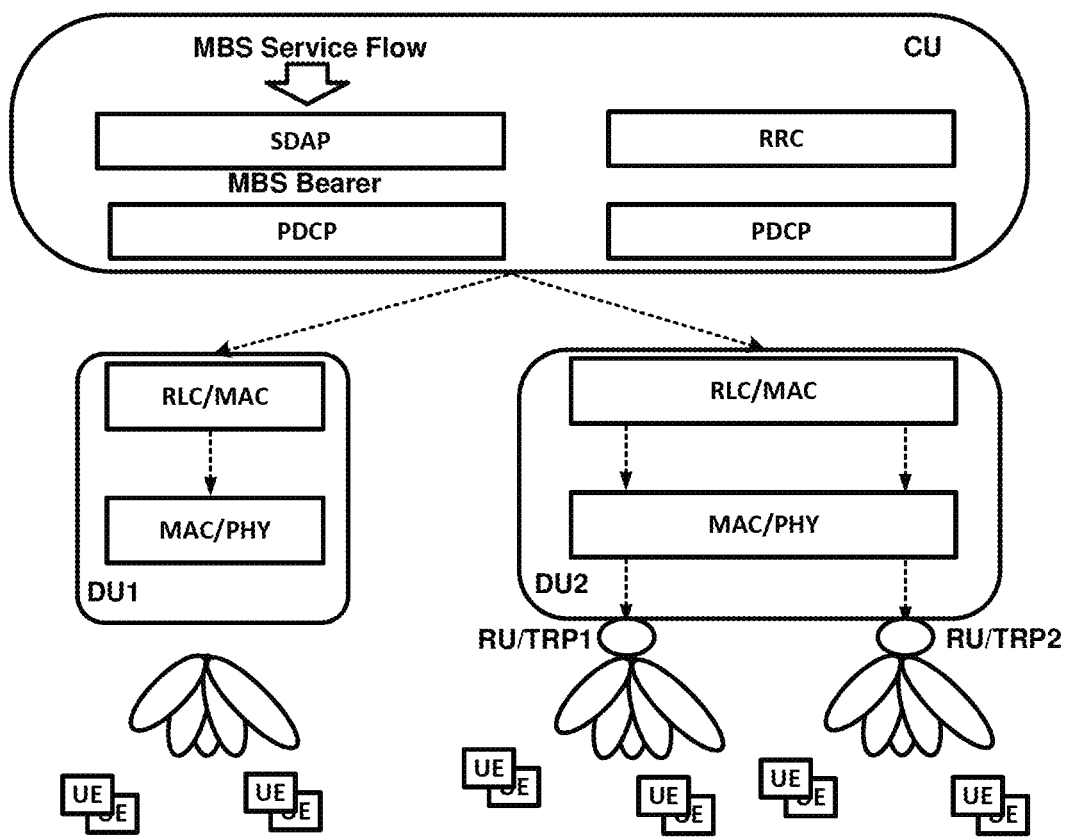
FIG. 18 shows example selective multicast broadcast service (MBS) transmissions involving multiple distributed units (DUs), remote units (RUs), transmission reception points (TRPs) and/or beams according to some aspects of some of various exemplary embodiments of the present disclosure.

Example embodiments may employ various multipoint transmission scenarios such as multi-connectivity involving multiple gNBs or Central Units (CUs); multiple TRPs across DUs with single CU, e.g., different MAC layers; multiple TRP across multiple Radio Units (RUs) within a DU managed by the same MAC layer; use of multiple beams within the same DU/RU; etc. An example scenario is shown in FIG. 18. Efficient and reliable delivery of MBS transmissions in FR1 and/or FR2 may allow use of multiple TRPs and beam forming to ensure coverage and reliability of MBS delivery.

In some examples, some or all members of a multicast group may be moving, e.g. in V2X application. The physical layer and radio transmission configuration, for example the selection of TRP(s) and/or DU(s) an/or beam(s) involved may be updated. In some examples, selection of TRP(s)/DU(s)/beam(s) and proper configuration MBS PHY parameters may be closed loop requiring some feedback from UEs. Based on UEs feedback/measurement information the gNB may efficiently configure MBS transmission parameters and/or select TRP(s)/DU(s)/beam(s) for reliable and efficient MBS data and may affect overall spectrum efficiency. Maintaining efficient MBS delivery on one or multiple TRPs and/or beams may require some feedback from UEs within MBS group.

In some examples, while UEs feedback may be important to adjust MBS transmission configuration and parameters, unlike unicast transmissions, the RAN may not make the adjustments based on individual UE feedback. In some examples, RAN's selection of TRP, beams and PHY parameters for MBS may rely on a processing of feedback from multiple UEs over a period of time. In some examples, MBS transmission configurations may be updated semi-dynamically based on a processing of feedback/measurements from multiple UEs over a period of time. In some examples, two types of decisions related to MBS transmission configuration, including the selection of TRPs/Beams and MCS/MIMO configuration may be considered.

In some examples, fast feedback from specific UEs may not be required and the base station may mainly rely on longer term RRM measurements such as layer one reference signal received power (L1 RSRP)/layer one reference signal received quality (RSRQ) or layer 3 reference signal received power (L3 RSRP)/layer 3 reference signal received quality (L3 RSRQ) reported from UEs within a group.

In some examples, the set of antenna ports and/or beams and/or TRPs used for MBS transmission, and associated reference signals (e.g., CSI-RS/SSB), may be different from those used for unicast transmission for a given UE. The reporting from UEs may be based on different triggers than those used for unicast and may involve some randomization to avoid similar reporting from many UEs. In some examples, the UEs within an MBS group may be configured with MBS specific RRM measurement/reporting configuration.

Figure 19:
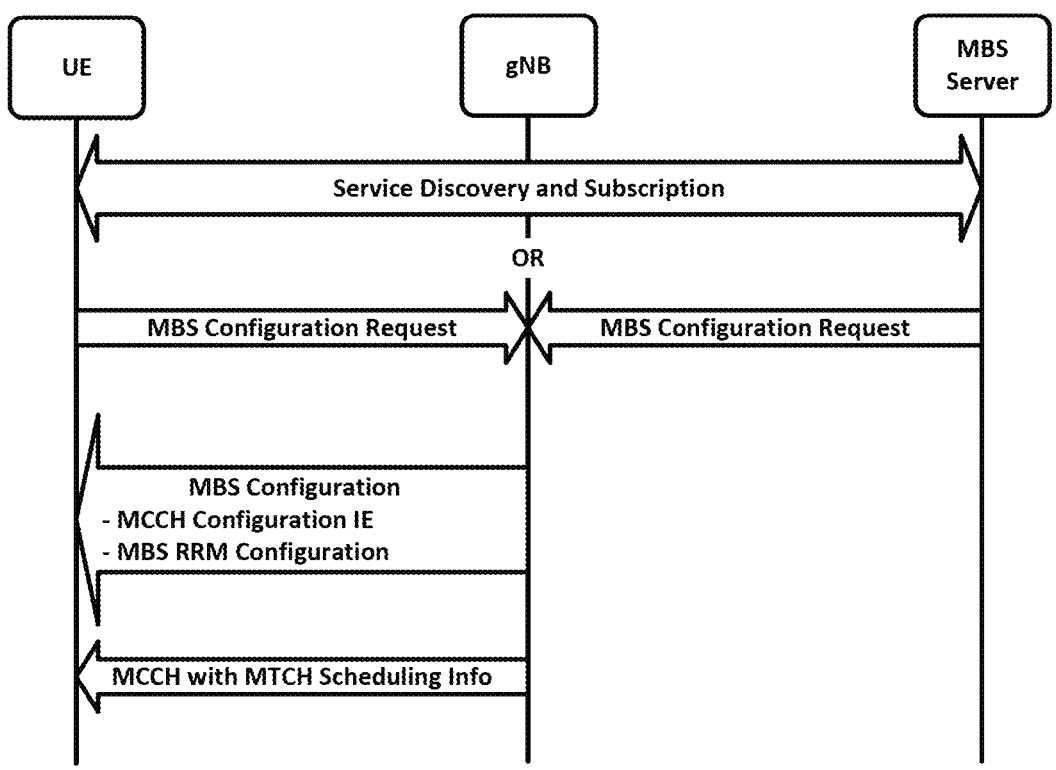
FIG. 19 shows example multicast broadcast service (MBS) radio resource management (RRM) Measurement Configuration according to some aspects of some of various exemplary embodiments of the present disclosure.

In some examples, a DRX based approach or configured scheduling may be used for MBS resource scheduling. In some examples, the MBS configuration may be provided to UE through broadcast or dedicated RRC messaging. In some examples, RRC configuration may be used not only for source allocation but also to send Information Elements (IE) with RRM measurement/reporting directions for UEs. Example MBS RRM Measurement Configuration as part of MBS Configuration Signaling is shown in FIG. 19. In some examples, an RRC message containing MBS Configuration may include configuration of measurement and reporting specifically used for MBS transmission. In some examples, the MBS RRM configuration IEs may include information about reference signals (CSI-RS/SSBs) resource sets to be measured and reporting triggers and periodicity.

In some examples, the UEs with MBS service may be configured to make layer one (L1) and layer three (L3) RSRP/RSRQ measurements on a set of candidate CSI-RS/SSB resources which may be used or considered by RAN for MBS transmission. In some examples, the set may involve multiple DUs and may also include multiple beams/TRPs within each DU. In some example, for each candidate beam/TRP/port, e.g. CSI-RS or SSB RS set, for MBS transmission a TCI may be configured to be used for quasi-colocation (QCL) scheduling signaling and UE reporting.

In some examples, redundant reporting from UEs may be limited while seeking feedback from all UEs in an MBS group. In some examples, the MBS measurement reporting configuration may be designed to limit the amount of reporting from UEs in the MBS group. In some examples, the MBS RRM reporting from UEs within multicast group may be triggered randomly in time, e.g. based on a predefined or network assigned number such as UE's member number within a group or some hashing based UE-ID or C-RNTI may be applicable.

In some examples, MBS delivery may be supported to member UEs in idle/inactive states. The selection of TRP/Beam may be considered for idle/inactive UEs. The MBS RRM measurement reporting may be allowed from UEs in RRC Inactive and Idle state.

In some examples, MBS RRM measurement reporting may be configured both periodically and aperiodically as triggered by the RAN.

Figure 20:
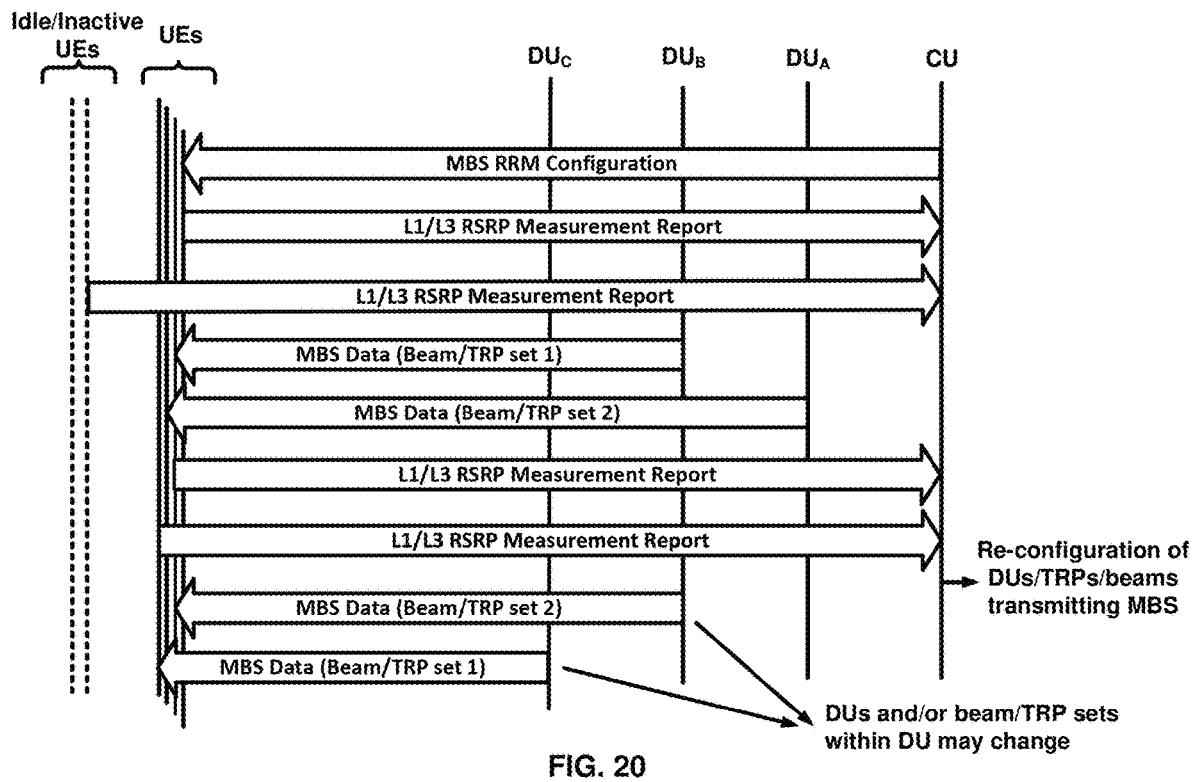
FIG. 20 shows example multicast broadcast service (MBS) distributed unit (DU)/transmission reception point (TRP)/beam change based on radio resource management (RRM) measurement reporting according to some aspects of some of various exemplary embodiments of the present disclosure.

In some examples as shown in FIG. 20, the RAN may change the configuration of TRPs/beams used to transmit MBS levels based on received reports from UEs over a period of time. Such change may involve changing DUs transmitting MBS and/or RU/Beams/TRPs transmitting MBS within a DU. The UEs may receive MBS from a single of multiple TRPs based on single or multiple DCI reception with TCI fields in the DCI. FIG. 20 shows an example MBS DU/TRP/Beam Change based on RRM measurement reporting from UEs in RRC Connected, Idle and/or Inactive state.

In some examples, reporting frequency may be randomized with higher probability for UE in connected state and lower probability for UEs in inactive and idle state. In some examples, to allow for better power saving, UE's in Idle/Inactive state may send MBS RRM report when they receive weak signals, e.g. low RSRPs, on all RSs associated with all TRPs/Beams currently used for MBS transmissions.

In some examples, MBS RRM Reporting from UEs within multicast group, especially those in idle/inactive state, may be limited to when a change in TRP/Beams used for MBS is needed to maintain reliable data delivery.

In some examples, the Idle and Inactive state UEs may need to return to RRC connected state to send their MBS RRM report or include such report in their RACH message without RRC connection. For example, the inactive/idle UEs may send the MBS RRM measurement using a 2-step RACH without establishing an RRC connection.

In some examples, the beam level L1 RSRP or cell level L3 RSRP/RSRQ reporting information may be simplified and reduced in size based on selection of MBS candidate reference signal resource sets to reduce the feedback overhead.

Reliable and efficient transmission of MBS data may require transmission from one or multiple transmission reception points (TRPs). Existing solutions for multi-TRP transmissions and TRP(s) selection processes are designed for unicast services and may not be efficient for multicast or broadcast of MBS data to a plurality of UEs to which MBS data is delivered. Example embodiments enhance the RRM measurement and multi-TRP transmissions associated with MBS services.

Figure 21:
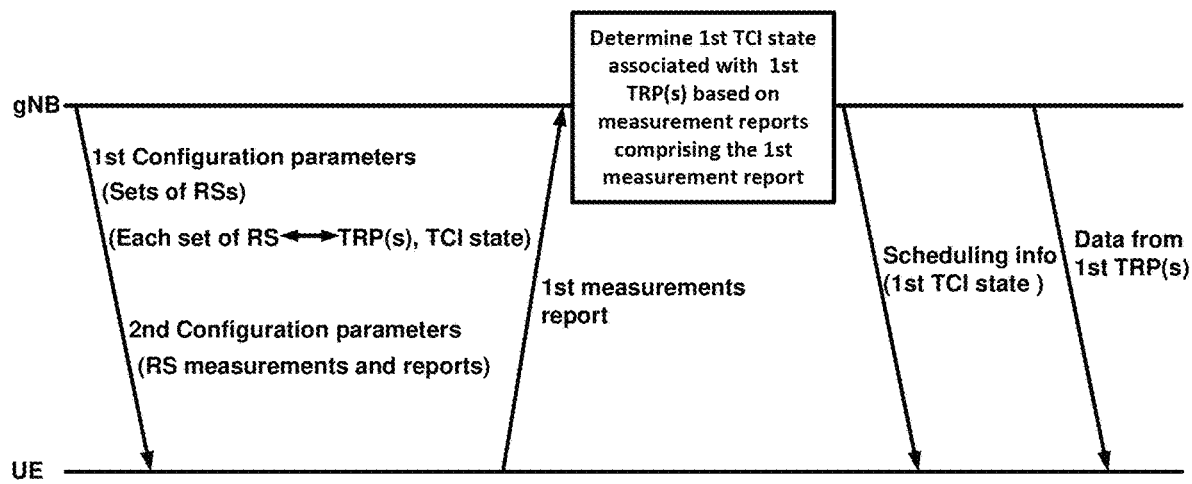
FIG. 21 shows an example process according to some aspects of some of various exemplary embodiments of the present disclosure.

In an example embodiment as shown in FIG. 21, a first UE may receive, from a base station, one or more messages comprising configuration parameters. The one or more messages may comprise RRC messages. In some examples, some of the one or more messages may be dedicated RRC messages and some of the one or more messages may be broadcast messages (e.g., SIB messages). The configuration parameters may comprise first configuration parameters and second configuration parameters. The first configuration parameters may be of a plurality of sets of reference signals (RSs). In an example, the plurality of sets of reference signals may be configured for the MBS services. In an example, the plurality of sets of reference signals for MBS may not be used for measurements associated with unicast. A set of reference signals may comprise CSI-RSs and/or SSBs. Each set of reference signals, in the plurality of sets of reference signals, may be associated with one or more transmission reception points (TRPs) of a plurality of TRPs of the base station. In some examples, a TRP of the BS may be associated with a distributed unit (DU) of the BS. In some examples, a TRP of the BS may be associated with a remote unit (RU) of the BS. Each set of reference signals, in the plurality of sets of the reference signals, may be associated with a transmission configuration indication (TCI) state. The first configuration parameters may indicate the association between each set of reference signals (and/or its corresponding one or more TRPs) and the TCI state. For example, the first configuration parameters may comprise an identifier (e.g., a TCI state ID) associated with each set of reference signals (and/or its corresponding one or more TRPs). The second configuration parameters may be used for reference signals measurement and reporting. The second configuration parameters may be used for radio resource management (RRM) measurement. The RRM measurement configuration parameters may be used for reference signal received power (RSRP) or reference signal received quality (RSRQ) measurement of reference signals.

The first UE may use the second configuration parameters for reference signals measurement and reporting and may measure different sets of reference signals (e.g., configured according to the first configuration parameters) and may transmit a first measurement report to the base station. In some examples, the transmission of the first measurement report may be via an RRC message. In some examples, the transmission of the first measurement report may be via an uplink control channel. The first UE may be in an RRC Connected state or in an RRC Idle/RRC Inactivate state. In some examples, the transmission of the first measurement report may be event-based, for example based on the measured RSRPs or RSRQs of reference signals in a set of reference signals and based on whether the measured RSRPs or RSRQs are below a threshold (e.g., a configurable threshold, e.g., an RRC configured threshold). In some examples, the transmission of the first measurement report may be periodic and based on a periodicity (e.g., a configurable periodicity, e.g., an RRC configured periodicity). In some examples, the transmission of the first measurement report may be aperiodic (e.g., based on a request from the BS). For example, the first UE may receive a command indicating the request for the first measurement report. In some examples, the command may be via a DCI comprising a field with a value indicating the request for the first measurement report. In some examples, the command may be via a MAC CE indicating a request for transmission of the first measurement report. In some examples, the transmission of the first measurement report may be based on a random schedule and/or according to a probability and/or triggered randomly in time. The random triggering of the measurement report may be based on a pre-defined or network assigned number. The first UE may determine a transmission probability based on the pre-defined or network assigned number and may transmit the first measurement report based on the probability. In some examples, the first UE may be in one of the RRC Connected or RRC Inactive/Idle state and the determined probability for measurement reporting may be higher when the first UE is in the RRC Connected state compared to when the first UE is in RRC Idle/Inactive state. In some examples, when the first UE is in the RRC Connected/Inactive state, the first UE may transmit the first measurement report based on a random access process (e.g., a Msg A in a 2-step random access process and a Msg 3 in a 4-step random access process).

The pre-defined or the network assigned number may be a C-RNTI or a UE ID. The first UE may receive a configuration parameter indicating the C-RNTI or the UE ID. For example, the transmission of the first measurement report may be randomized by different UEs to limit the amount of measurement report feedback. For example, the one or more messages may comprise one or more parameters indicating the random schedule for transmission of the measurement reports. The first measurement report may comprise measurement information associated with one or more sets of reference signals of the plurality of sets of reference signals.

The first UE may receive scheduling information (e.g., one or more DCIs comprising the scheduling information) indicating a first TCI state. For example, a DCI in the one or more DCIs comprising the scheduling information may comprise a TCI state field with a value indicating the first TCI state. The first UE may receive the scheduling information in response to transmitting the first measurement report. The base station may receive a plurality of measurement reports, including the first measurement report from the first UE, and may determine the scheduling information and first TCI state based on the plurality of measurement reports. In some examples, the base station may receive the plurality of measurement reports in a period of time. The base station may transmit the scheduling information indicating the first TCI state after the determining. The first TCI state may be associated with one or more first or identified TRPs of the plurality of TRPs. The first UE may receive data from the one or more first or identified TRPs based on the scheduling information. The data may be associated with multicast and broadcast (MBS) services.

In an embodiment, a first user equipment (UE) may receive, from a base station (BS): first configuration parameters of a plurality of sets of reference signals (RSs), wherein individual set of RSs, in the plurality of sets of RSs, may be associated with: one or more TRPs in a plurality of TRPs of the BS; and a transmission configuration indicator (TCI) state. The first UE may further receive, from the BS, second configuration parameters for RS measurements and reports. The first UE may transmit a first measurement report based on the second configuration parameters and one or more sets of RSs of the plurality of sets of RSs. The first UE may receive, based on a plurality of measurement reports from a plurality of UEs comprising the first measurement report by the first UE, scheduling information indicating a first TCI state associated with one or more first TRPs of the plurality of TRPs. The first UE may receive data from the one or more first TRPs.

In some embodiments, the data may be associated with multicast and broadcast services (MBS) services.

In some embodiments, the plurality of sets of reference signals (RSs) may be configured for multicast and broadcast services (MBS) services.

In some embodiments, the reference signal (RS) measurements and reports may be based on a layer 1 or a layer 3 RS received power (RSRP) or RS received quality (RSRQ).

In some embodiments, the reference signals (RSs) in a set of RSs may be channel state information RSs (CSI-RSs).

In some embodiments, the reference signals (RSs) in a set of RSs may be synchronization signal blocks (SSBs).

In some embodiments, at least one of the first configuration parameters and the second configuration parameters may be received via one or more dedicated radio resource control (RRC) messages.

In some embodiments, the first UE may determine to transmit the first measurement report based on a schedule.

In some embodiments, transmitting the first measurement report may be triggered randomly in time. In some embodiments, the random triggering may be based on a pre-defined or network assigned number. In some embodiments, the pre-defined or the network assigned number may be a user equipment (UE) identifier (ID). In some embodiments, the user equipment (UE) identifier (ID) may be a cell radio network temporary identifier (C-RNTI).

In some embodiments, transmitting the first measurement report may be triggered periodically in time.

In some embodiments, transmitting the first measurement report may be triggered based on a request from the base station. In some embodiments, the first UE may receive a command from the base station indicating the request for transmission of the first measurement report. In some embodiments, the command may be based on a value of a field in a downlink control information. In some embodiments, the command may be a medium access control (MAC) control element (CE).

In some embodiments, the first user equipment (UE) may be in one of a radio resource control (RRC) connected state and an RRC idle state or RRC inactive state and the first UE may have a higher chance of transmitting a measurement report when the UE is in the RRC connected state than when the UE is in the RRC idle state or the RRC inactive state. In some embodiments, the first UE may transmit the measurement report based on a random access procedure when the UE is in radio resource control (RRC) idle state or the RRC inactive state.

In some embodiment, the first user equipment (UE) may be in a radio resource control (RRC) idle state or RRC inactive state. The reference signal (RS) measurements and reports may be based on a layer 1 or a layer 3 RS received power (RSRP) or RS received quality (RSRQ). The transmitting the first measurement report may be based on the layer 1 or the layer 3 RSRP or RSRQ being lower than a threshold.

In some embodiments, the plurality of transmission reception points (TRPs) may be associated with one or more distributed units (DUs) of the base station (BS).

In some embodiments, transmitting the scheduling information may be via one or more downlink control information (DCIs) indicating the first TCI state. In some embodiments, a downlink control information (DCI) in the one or more DCIs may comprise a transmission configuration indicator (TCI) field with a value indicating the first TCI state.

In some embodiments, transmitting the first measurement report may be via a radio resource control (RRC) message.

In some embodiments, the scheduling information may be determined based on the plurality of measurement reports transmitted by the plurality of user equipments (UEs) comprising the first UE.

In some embodiments, receiving the scheduling information may indicate switching from one or more second transmission reception points (TRPs), associated with a second transmission configuration indicator (TCI) state to the one or more first TRPs associated with the first TCI state.

In an embodiment, a base station (BS) may receive, from a plurality of user equipments (UEs), comprising a first UE, a plurality of measurement reports comprising a first measurement report from the first UE. The BS may determine one or more first TRPs, of a plurality of TRPs of the BS, for the first UE based on the plurality of measurement reports from the plurality of UEs. The BS may transmit, to the first UE, scheduling information indicating a first TCI state associated with the one or more first TRPs. The BS may transmit, to the first UE, data via the one or more first TRPs.

In some embodiments, the data may be associated with multicast and broadcast services (MBS) services.

In some embodiments, determining the one or more first TRPs may be based on the plurality of measurement reports from the plurality of UEs received over a period of time.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure.

Thus, the disclosure is not limited to the examples and designs described herein but is to be accorded the broadest scope consistent with the principles and novel features disclosed herein.

Clause 1. A method of selective transmission reception point (TRP)-based communications comprising:
receiving, by a first user equipment (UE) control information including:
first configuration parameters of a plurality of sets of reference signals wherein individual sets of reference signals of the plurality of sets of reference signals, are associated with one or more TRPs in a plurality of TRPs of a network node and a transmission configuration indication (TCI) state; and
second configuration parameters for reference signal measurements and reports for identified sets of reference signals;
transmitting a measurement report based on the second configuration parameters and one or more identified sets of reference signals of the plurality of sets of reference signals received by the UE;
receiving scheduling information indicating a first TCI state associated with one or more identified TRPs of the plurality of TRPs of the network node, wherein the scheduling information is based, at least in part, on a plurality of received measurement reports transmitted by a plurality of UEs; and
receiving data from the identified one or more identified TRPs.

Clause 2. The method of Clause 1, wherein the data received from the one of more first TRPs is associated with multicast and broadcast services (MBS) services.

Clause 3. The method of Clause 1, wherein individual sets of reference signals of the plurality of sets of reference signals are configured for multicast and broadcast services (MBS) services.

Clause 4. The method of Clause 1, wherein the reference signal measurements and reports are based on a layer 1 or a layer 3 reference signals received power (RSRP).

Clause 5. The method of Clause 1, wherein the reference signal measurements and reports are based on a reference signals received quality (RSRQ).

Clause 6. The method of Clause 1, wherein the reference signals of the set of reference signals of the plurality of sets of reference signals are channel state information reference signals (CSI-RSs).

Clause 7. The method of Clause 1, wherein the reference signals of the set of reference signals of the plurality of sets of reference signals are synchronization signal blocks (SSBs).

Clause 8. The method of Clause 1, wherein receiving, the control information includes receiving the control information via one or more dedicated radio resource control (RRC) messages.

Clause 9. The method of Clause 1, wherein transmitting a measurement report based on the second configuration parameters and one or more identified sets of reference signals includes transmitting the measurement report based on a schedule.

Clause 10. The method of Clause 1, wherein transmitting the measurement report based on the second configuration parameters and one or more identified sets of reference signals includes transmitting the measurement report based on triggering information corresponding to random timing information.

Clause 11. The method of Clause 10, wherein transmitting the measurement report based on triggering information corresponding to random timing information includes transmitting the measurement report based on a pre-defined or network assigned number.

Clause 12. The method of Clause 11, wherein the pre-defined or the network assigned number is a UE identifier (ID).

Clause 13. The method of Clause 12, wherein the UE ID is a cell radio network temporary identifier (C-RNTI).

Clause 14. The method of Clause of Clause 1, wherein transmitting the measurement report based on the second configuration parameters and one or more identified sets of reference signals includes transmitting the measurement report periodically in time.

Clause 15. The method of Clause 1, wherein transmitting the measurement report based on the second configuration parameters and one or more identified sets of reference signals includes transmitting the measurement report based on a request from the base station (BS).

Clause 16. The method of Clause 15 further comprising receiving a command from the base station indicating the request for transmission of the first measurement report.

Clause 17. The method of Clause 16, wherein the command is based on a value of a field in a downlink control information.

Clause 18. The method of Clause 17, wherein the command is a medium access control (MAC) control element (CE).

Clause 19. The method of Clause 1, wherein transmitting the measurement report based on the second configuration parameters and one or more identified sets of reference signals includes transmitting is selective based on a radio resource control (RRC) state of the first UE.

Clause 20. The method of Clause 19, wherein transmitting the measurement report based on the second configuration parameters and one or more identified sets of reference signals includes transmitting the measurement report based on a random access procedure when the first UE is in an RRC idle state or an RRC inactive state.

Clause 21. The method of Clause 20, wherein
transmitting the measurement report based on the second configuration parameters and one or more identified sets of reference signals includes transmitting of the first measurement report is based on attributes of the reference signals being lower than a threshold.

Clause 22. The method of Clause 1, wherein the plurality of transmission reception points (TRPs) are associated with one or more distributed units (DUs) of the base station.

Clause 23 The method of Clause 1, wherein transmitting the measurement report based on the second configuration parameters and one or more identified sets of reference signals includes transmitting via one or more downlink control information (DCIs) indicating the first TCI state.

Clause 24. The method of Clause 23, wherein the DCI includes a transmission configuration indication (TCI) field with a value indicating the first TCI state.

Clause 25. The method of Clause 1, wherein transmitting the measurement report based on the second configuration parameters and one or more identified sets of reference signals includes transmitting via a RRC message.

Clause 26. The method of Clause 1, wherein the receiving the scheduling information indicates switching from one or more second transmission reception points (TRPs), associated with a second transmission configuration indication (TCI) state, to the one or more first TRPs associated with the first TCI state.

Clause 27. A method of selective transmission reception point (TRP)-based communications comprising:
receiving a plurality of measurement reports, wherein individual measurement reports of the plurality of measurement reports are transmitted from individual user equipment;
determining, one or more TRPs based on the plurality of measurement reports from the plurality of UEs; and
transmitting information indicating a first TCI state associated with the one or more first TRPs.

Clause 28. The method of Clause 27 further comprising transmitting data via the one or more first TRPs.

Clause 29. The method of Clause 27, wherein the transmitted data is associated with MBS services.

Clause 30. The method of Clause 27, wherein determining the one or more first TRPs is based on the plurality of measurement reports from the plurality of user equipment received over a period of time.

Clause 31. An apparatus for utilization in wireless communications comprising:
an antenna for use in transmission of electromagnetic signals;
a memory for maintaining computer-readable code; and
a processor for executing the computer-readable code that causes the apparatus to:
receive control information including:
first configuration parameters of a plurality of sets of reference signals wherein individual sets of reference signals of the plurality of sets of reference signals, are associated with one or more TRPs in a plurality of TRPs of a network node and a transmission configuration indication (TCI) state; and
second configuration parameters for reference signal measurements and reports for identified sets of reference signals;
transmit a measurement report based on the second configuration parameters and one or more identified sets of reference signals of the plurality of sets of reference signals received by the UE;
receive scheduling information indicating a first TCI state associated with one or more identified TRPs of the plurality of TRPs of the network node, wherein the scheduling information is based, at least in part, on a plurality of received measurement reports transmitted by a plurality of UEs; and
receive data from the identified one or more identified TRPs.

Clause 32. The method of clause 1, wherein the data received from the one of more first TRPs is associated with multicast and broadcast services (MBS) services.

Clause 33. The method of clause 31, wherein individual sets of reference signals of the plurality of sets of reference signals are configured for multicast and broadcast services (MBS) services.

Clause 34. The method of clause 31, wherein the reference signal reference signals) measurements and reports are based on a layer 1 or a layer 3 reference signals received power (RSRP).

Clause 35. The method of clause 31, wherein the reference signal reference signals) measurements and reports are based on a reference signals received quality (RSRQ).

Clause 36. The method of clause 31, wherein the reference signals of the set of reference signals of the plurality of sets of reference signals are channel state information reference signals (CSI-RSs).

Clause 37. The method of clause 31, wherein the reference signals of the set of reference signals of the plurality of sets of reference signals are synchronization signal blocks (SSBs).

Clause 38. The method of clause 31, wherein the apparatus receives the control information via one or more dedicated radio resource control (RRC) messages.

Clause 39. The method of clause 31, wherein transmitting a measurement report based on the second configuration parameters and one or more identified sets of reference signals includes transmitting the measurement report based on a schedule.

Clause 40. The method of clause 41, wherein the apparatus transmits the measurement report based on triggering information corresponding to random timing information.

Clause 41. The method of clause 40, wherein the apparatus transmits the measurement report based on a pre-defined or network assigned number.

Clause 42. The method of clause 41, wherein the pre-defined or the network assigned number is a UE identifier (ID).

Clause 43. The method of clause 42, wherein the UE ID is a cell radio network temporary identifier (C-RNTI).

Clause 44. The method of clause of clause 41, wherein the apparatus transmits the measurement report periodically in time.

Clause 45. The method of clause 41, wherein the apparatus transmits the measurement report based on a request from the base station (BS).

Clause 46. The method of clause 45, wherein the apparatus transmits a command from the base station indicating the request for transmission of the first measurement report.

Clause 47. The method of clause 46, wherein the command is based on a value of a field in a downlink control information.

Clause 48. The method of clause 47, wherein the command is a medium access control (MAC) control element (CE).

Clause 49. The method of clause 31, wherein transmitting the measurement report based on the second configuration parameters and one or more identified sets of reference signals includes transmitting is selective based on a radio resource control (RRC) state of the first UE.

Clause 50. The method of clause 49, wherein the apparatus transmits the measurement report based on a random access procedure when the first UE is in an RRC idle state or an RRC inactive state.

Clause 51. The method of clause 50, wherein the apparatus transmits the first measurement report is based on attributes of the reference signals being lower than a threshold.

Clause 52. The method of clause 31, wherein the plurality of transmission reception points (TRPs) are associated with one or more distributed units (DUs) of the base station.

Clause 53 The method of clause 31, wherein the apparatus transmits via one or more downlink control information (DCIs) indicating the first TCI state.

Clause 54. The method of clause 53, wherein the DCI includes a transmission configuration indication (TCI) field with a value indicating the first TCI state.

Clause 55. The method of clause 31, wherein the apparatus transmits via a RRC message.

Clause 56—The method of clause 31, wherein the receiving the scheduling information indicates switching from one or more second transmission reception points (TRPs), associated with a second transmission configuration indication (TCI) state, to the one or more first TRPs associated with the first TCI state.

Clause 57. An apparatus for utilization in wireless communications comprising:
an antenna for use in transmission of electromagnetic signals;
a memory for maintaining computer-readable code; and
a processor for executing the computer-readable code that causes the apparatus to:
receive a plurality of measurement reports, wherein individual measurement reports of the plurality of measurement reports are transmitted from individual user equipment;
determine, one or more TRPs based on the plurality of measurement reports from the plurality of UEs; and
transmit information indicating a first TCI state associated with the one or more first TRPs.

Clause 58. The method of clause 57, wherein the apparatus transmits data via the one or more first TRPs.

Clause 59. The method of clause 57, wherein the transmitted data is associated with MBS services.

Clause 60. The method of clause 57, wherein determining the one or more first TRPs is based on the plurality of measurement reports from the plurality of user equipment received over a period of time.

The invention claimed is:

1. A method of transmission reception point (TRP)-based communications comprising:
receiving, by a first user equipment (UE) from a network node,
first configuration parameters of a plurality of sets of reference signals, wherein individual sets of reference signals of the plurality of sets of reference signals, are associated with a transmission configuration indication (TCI) state, and
second configuration parameters for reference signal measurements and reports for the sets of reference signals;
transmitting, by the UE to the network node, one or more measurement reports based on the second configuration parameters and one or more sets of reference signals of the plurality of sets of reference signals received by the UE;
receiving, by the UE from the network node, scheduling information indicating a first TCI state; and
receiving, by the UE from the network node, data based on the first TCI state.

2. The method of claim 1, wherein the data is associated with multicast and broadcast services (MBS) services.

3. The method of claim 1, wherein individual sets of reference signals of the plurality of sets of reference signals are configured for multicast and broadcast services (MBS) services.

4. The method of claim 1, wherein the reference signal measurements and reports are based on at least one of: a layer 1 or a layer 3 reference signals received power (RSRP); and a reference signal received quality (RSRQ).

5. The method of claim 1, wherein the reference signals of the set of reference signals of the plurality of sets of reference signals are at least one of: channel state information reference signals (CSI-RSs); and synchronization signal blocks (SSBs).

6. The method of claim 1, wherein receiving, the first configuration parameters and the second configuration parameters includes receiving the first configuration parameters and the second configuration parameters via one or more dedicated radio resource control (RRC) messages.

7. The method of claim 1, wherein transmitting the one or more measurement reports based on the second configuration parameters and one or more sets of reference signals includes at least one of: transmitting the one or more measurement reports based on a schedule; transmitting the one or more measurement reports based on triggering information corresponding to random timing information; and transmitting the one or more measurement reports based on a pre-defined or network assigned number.

8. The method of claim 1, wherein transmitting the one or more measurement reports based on the second configuration parameters and one or more sets of reference signals includes transmitting the one or more measurement reports periodically in time.

9. The method of claim 1, wherein transmitting the one or more measurement reports based on the second configuration parameters and one or more sets of reference signals includes transmitting the one or more measurement reports based on a request from a base station (BS).

10. The method of claim 9 further comprising receiving a command from the base station indicating a request for transmission of a first measurement report.

11. The method of claim 1, wherein transmitting the one or more measurement reports based on the second configuration parameters and one or more sets of reference signals includes transmitting a first measurement report being selective based on a radio resource control (RRC) state of the UE.

12. The method of claim 11, wherein transmitting the one or more measurement reports based on the second configuration parameters and one or more sets of reference signals includes transmitting the one or more measurement reports based on a random access procedure when the UE is in an RRC idle state or an RRC inactive state.

13. The method of claim 11, wherein transmitting the one or more measurement reports based on the second configuration parameters and one or more sets of reference signals includes transmitting of the first measurement report based on attributes of the reference signals being lower than a threshold.

14. The method of claim 9, wherein a plurality of transmission reception points (TRPs) are associated with one or more distributed units (DUs) of the base station.

15. The method of claim 1, wherein transmitting the one or more measurement reports based on the second configuration parameters and one or more sets of reference signals includes at least one of: transmitting via one or more downlink control information (DCIs) indicating the first TCI state; and transmitting via a RRC message.

16. The method of claim 14, wherein the receiving the scheduling information indicates switching from one or more second TRPs, associated with a second TCI state, to one or more first TRPs associated with the first TCI state.

17. A method of selective transmission reception point (TRP)-based communications comprising:
transmitting, by a network node to a user equipment (UE), first configuration parameters of a plurality of sets of reference signals, wherein individual sets of reference signals of the plurality of sets of reference signals, are associated with a transmission configuration indication (TCI) state; and
second configuration parameters for reference signal measurements and reports for the sets of reference signals;
receiving, by the network node from the UE, one or more measurement reports
transmitting, by the network node to the UE, scheduling information indicating a first TCI state; and
transmitting, by the network node to the UE, data based on the first TCI state.

18. The method of claim 17 further comprising determining the first TCI state associated with one or more first TRPs.

19. The method of claim 18 further comprising transmitting data via the one or more first TRPs.

20. The method of claim 19, wherein the transmitted data is associated with multicast and broadcast services (MBS) services.

21. The method of claim 18, wherein determining the first TCI state associated with the one or more first TRPs is based on the one or more measurement reports, and wherein the one or more measurement reports are from a plurality of user equipment received over a period of time.

* * * * *